(12) United States Patent
Nishimori

(10) Patent No.: US 7,128,113 B2
(45) Date of Patent: Oct. 31, 2006

(54) ATV RADIAL TIRE

(75) Inventor: Hiroyuki Nishimori, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/726,565

(22) Filed: Dec. 4, 2003

(65) Prior Publication Data

US 2004/0112499 A1    Jun. 17, 2004

(30) Foreign Application Priority Data

Dec. 13, 2002    (JP)    ............... 2002-362872

(51) Int. Cl.
*B60C 9/08*    (2006.01)
(52) U.S. Cl. ............... 152/541; 152/209 A; 152/209 D
(58) Field of Classification Search ........... 152/209.15, 152/209.22, 209.28, 209.3, 902, 157, 558, 152/133, 123, 130.7, 541, 209 A, DIG. 1, 152/209 D; 156/110.1
See application file for complete search history.

(56) References Cited

U.S. PATENT DOCUMENTS 5,109,903 A  *  5/1992  Watanabe et al. ...... 152/209.15

6,328,084 B1  *  12/2001  Caretta et al. ............... 152/541

FOREIGN PATENT DOCUMENTS

| DE | 19995658 A | * | 9/1999 |
|---|---|---|---|
| DE | 20035723 A | * | 1/2003 |
| EP | 1074405 A1 | * | 2/2001 |
| JP | 06255316 A | * | 9/1994 |
| JP | 7-329516 A |   | 12/1995 |
| JP | 11245627 A | * | 9/1999 |
| JP | 2000-225811 A |   | 8/2000 |
| JP | 2002059711 A | * | 2/2002 |
| JP | 20001167 A | * | 1/2003 |
| JP | 2003011617 A | * | 1/2003 |
| JP | 2003025810 A | * | 1/2003 |

* cited by examiner

*Primary Examiner*—Frantz F. Jules
(74) *Attorney, Agent, or Firm*—Birch, Stewart, Kolasch & Birch, LLP

(57) ABSTRACT

An ATV radial tire has a block pattern including a chamfered block. The chamfered block has a notch which comprises an inclined surface obtained by chamfering a corner between an upper surface of the block and a wall surface of the block on an outer side edge of the block which is directed outward of a vehicle when the tire is mounted on the vehicle.

16 Claims, 5 Drawing Sheets

ATV RADIAL TIRE

This Non-provisional application claims priority under 35 U.S.C. 517 119(a) on patent application No(s). 2002-362872 filed in Japan on Dec. 13, 2002, the entire contents of which are hereby incorporated by reference.

BACKGROUND OF THE INVENTION

1. Technical Field

The present invention relates to an ATV radial tire capable of enhancing cornering ability.

2. Background Technique

The ATV (All Terrain Vehicle) is for running on a bad road such as sandy road and dirt road, and the ATV is also called a buggy. The ATV comprises one or two front follower wheels and left and right rear driving wheels. A differential apparatus is not interposed between the driving wheel and the vehicle body. Therefore, since the left and right driving wheels always rotate at the same rotation number, it is necessary to laterally slide driving wheels at the time of cornering.

In recent ATV tires, a block pattern is employed in a tread surface so as to sufficiently secure the grip force on a bad road. However, the block pattern has high traction force which tries to advance forward, it is difficult to slide the tire at the time of cornering and thus, the cornering ability tends to be deteriorated. In a tire of radial structure, since a tread portion is reinforced by a belt layer, the tread rigidity is high and deformation of the block is small. Thus, the traction is further increased and the cornering ability is more deteriorated.

Thereupon, based on the idea that an outer edge of a block which is directed outward of a vehicle is provided with a chamfered block formed with a chamfered notch, it is an object of the present invention to provide an ATV radial tire capable of bringing traction ability and sliding ability in balance and capable of enhancing cornering ability with a simple structure.

SUMMARY OF THE INVENTION

The present invention provides an ATV radial tire of a block pattern in which a plurality of blocks are disposed on a tread surface at distances from one another, wherein the blocks includes a chamfered block, the chamfered block including a notch which comprises an inclined surface obtained by chamfering a corner between an upper surface of the block and a wall surface of the block on an outer side edge of the block which is directed outward of a vehicle when the tire is mounted on the vehicle.

It is preferable that an angle θ of the notch with respect to the upper surface of the block of the inclined surface is 30 to 60°, and a height h of the notch in its radial direction is 25 to 50% of a height H of the block of the chamfered block.

It is preferable that the chamfered block occupies 50 to 100% of the total number of blocks.

It is preferable that the chamfered block is laterally long in which a length of the block in an axial direction of the tire is longer than a length of the block in a circumferential direction of the tire, and the chamfered block comprises an outer side portion which is located outward of the vehicle, an inner side portion which is located inward of the vehicle and which is deviated in the circumferential direction of the tire with respect to the outer side portion, and a connecting portion which obliquely extends in the circumferential direction of the tire and connects the inner side portion and the outer side portion with each other.

DESCRIPTION OF PREFERRED EMBODIMENT

An embodiment of the present invention will be explained below based on the drawings.

Figure 1:
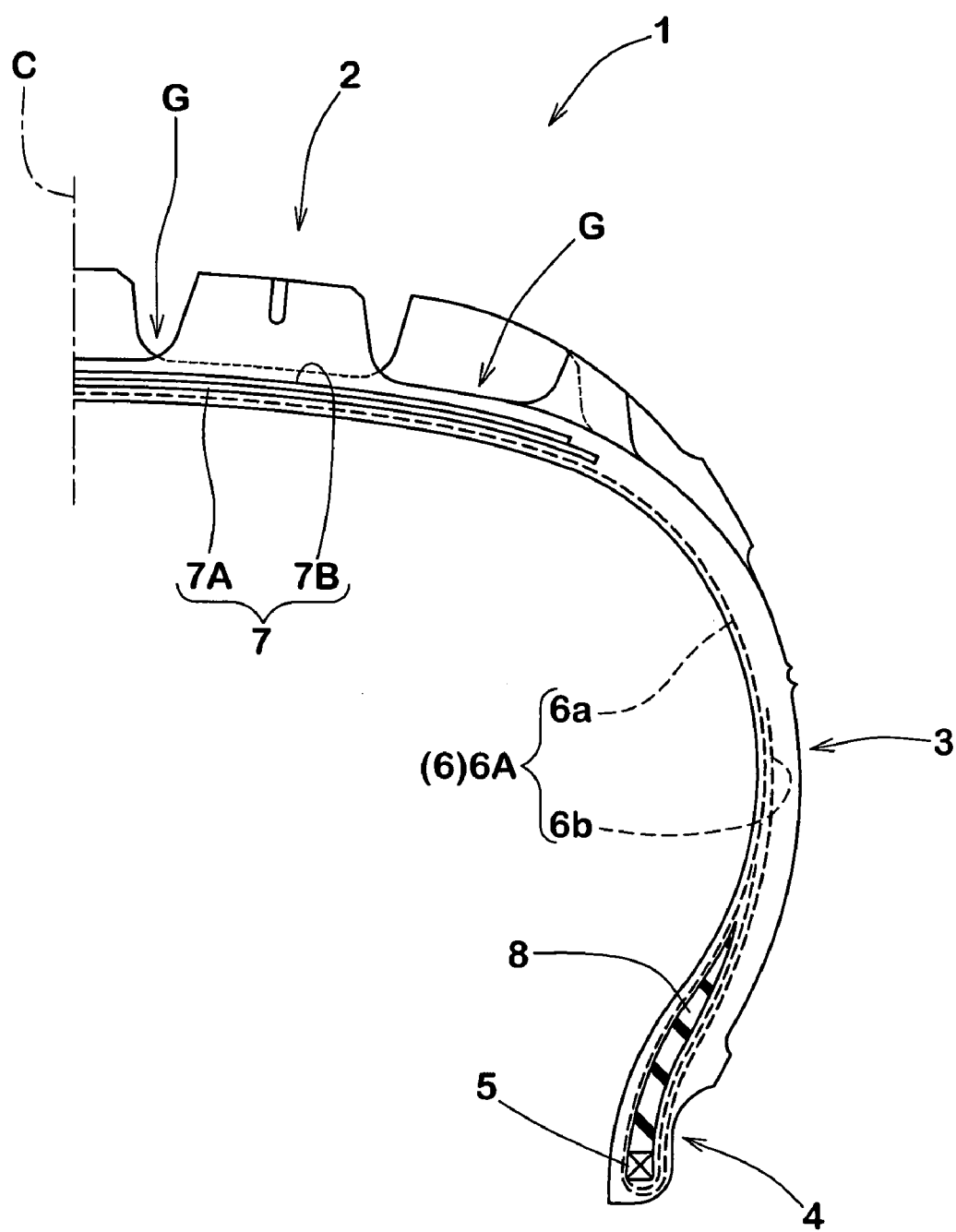
FIG. 1 is a sectional view showing an embodiment of an ATV radial tire of the present invention.
Figure 2:
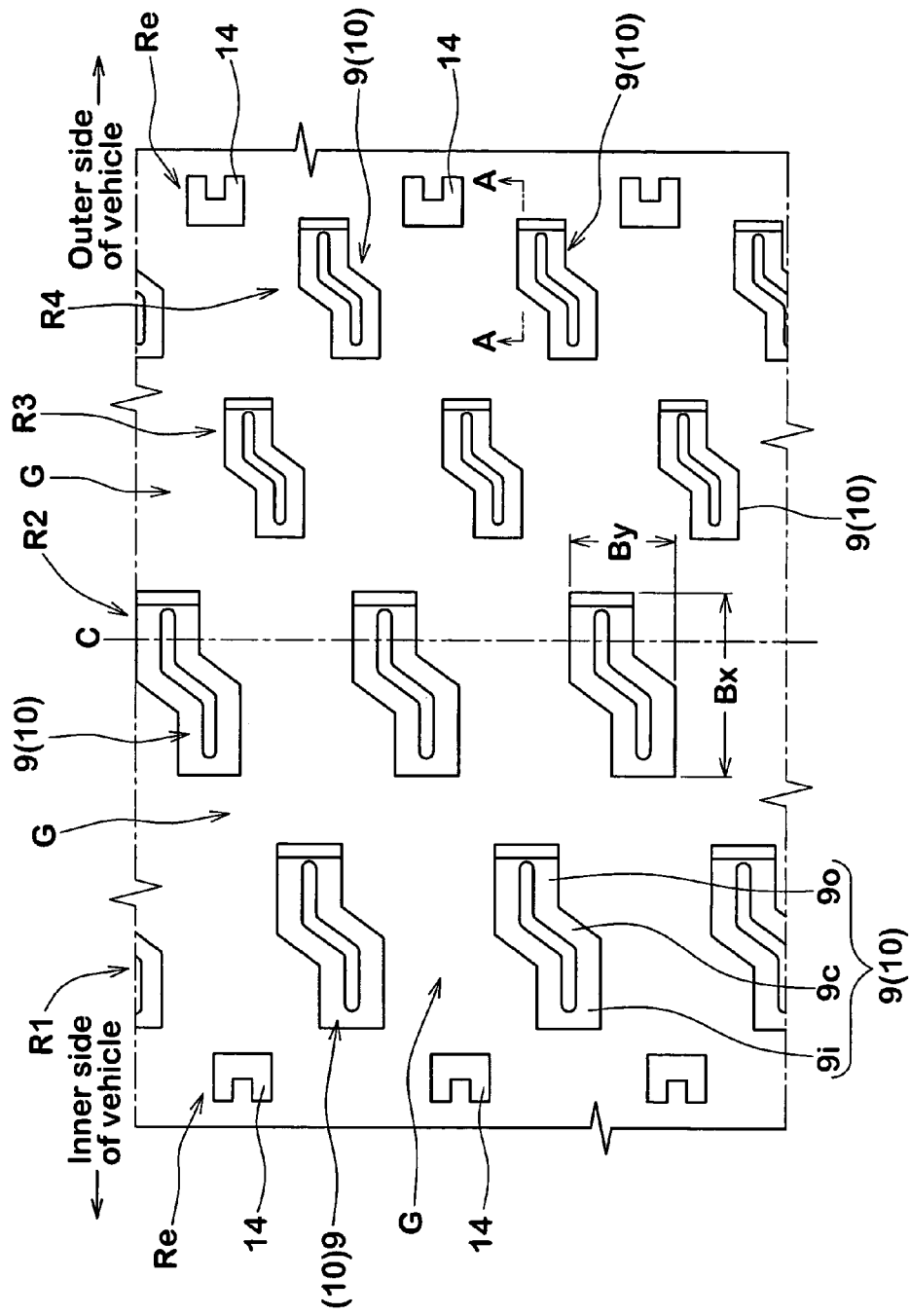
FIG. 2 is a development view showing one example of a tread pattern of the tire.

FIG. 1 is a sectional view showing an embodiment of an ATV radial tire of the present invention. FIG. 2 is a development view showing one example of a tread pattern of the tire.

In FIG. 1, an ATV radial tire 1 comprises a carcass 6 extending from a tread portion 2 to a bead core 5 of a bead portion 4 through a side wall portion 3, and a belt layer 7 disposed inside the tread portion 2 and outside the carcass 6 in the radial direction of the tire.

The carcass 6 is formed of one or more, preferably two carcass plies 6A in which carcass cords are arranged at an angle of 70° to 90° with respect to a circumferential direction. An organic fiber cord such as nylon, rayon and polyester is suitable as the carcass cord. At least one of the carcass plies 6A is preferably formed as a folded-back ply which comprises a toroidal body portion 6a astride between the bead cores 5 and 5, and a folded-backportion 6b which is folded back from inside to outside around the bead core 5 in the axial direction of the tire. A tapered apex rubber 8 extending from the bead core 5 radially outward of the tire is provided between the body portion 6a and the folded-back portion 6b of the carcass ply 6A.

The belt layer 7 is formed of one or more, in this embodiment, two belt plies 7A and 7B in which belt cords are arranged at an angle of 15° to 35° with respect to the circumferential direction of the tire. The belt cords intersect with the plies and the belt layer 7 enhances the rigidity of the belt, and the tread portion 2 is provided with hoop effect to strongly reinforce the tread portion 2. Since the ATV radial tire 1 is frequently used on a uneven bad road, the riding comfort and gap absorbing ability are extremely important. For this reason, the organic fiber cord having low modulus such as nylon, polyester and rayon is preferably used as the belt cord of the belt layer 7, like the carcass cord.

As shown in FIGS. 1 and 2, the tread portion 2 is provided with a block pattern in which a plurality of blocks 9 are disposed at distances from one another by forming wide tread grooves G. In this embodiment, in order to sufficiently secure the grip force on a soft road such as the dirt road and sandy road, a land ratio Sb/S which is a ratio between the entire area S of the tread surface and a surface area Sb (actual ground contact area) of the block 9 is set to as low as 15 to 25%. This increases a biting amount of the block 9 into the road surface.

Various shapes may be employed for the block 9, such as rectangular shape, trapezoidal shape, substantially pentagonal shape and elliptic shape as viewed from above. In view of the traction ability on the soft road, it is preferable that a length Bx of the block in the axial direction of the tire longer in the lateral direction, i.e., the length Bx is larger than a length By of the block in the circumferential direction of the tire (Bx>By) as in this embodiment. This ratio (Bx/By) of the block length is preferably 2.0 to 4.0, more preferably 2.5 to 3.5. If the ratio (Bx/By) of the block length is less than 2.0, the traction ability is insufficient on a bad road, and if the ratio exceeds 4.0, the rigidity of the block 9 in the circumferential direction of the tire is prone to be deteriorated extremely.

As shown in FIG. 2, each the block 9 comprises outer side portion 9o which is located at outer side of the vehicle when the tire is mounted to the vehicle, an inner side portion 9i which is located at inner side of the vehicle and is deviated from the outer side portion 9o in the circumferential direction of the tire, and a connecting portion 9c which connects the inner side portion 9i and the outer side portion 9o while inclining them with respect to the circumferential direction of the tire. In this embodiment, the inner side portion 9i and the outer side portion 9o are formed into rectangular shapes which extend in parallel to the axial direction of the tire. The connecting portion 9c is inclined through 30 to 60° with respect the circumferential direction of the tire.

Generally, in a laterally long block having a long block length Bx in the axial direction of the tire, the rigidity of the block in the circumferential direction of the tire is prone to be deteriorated. Especially when large braking force or driving force is applied, the block is largely deformed, and sufficient acceleration or braking force can not be obtained in some cases. Whereas, if the blocks 9 are laterally long and are provided at their central portions with the connecting portions 9c as in this embodiment, the rigidity of the blocks in the circumferential direction of the tire can be enhanced. With this configuration, even when large braking force or driving force is applied, it is possible to prevent the block 9 from being excessively deformed in the circumferential direction of the block, and sufficient acceleration or braking force can be obtained. An upper surface 12 of each the block may be provided with a recessed slot 15 or sipeing (not shown).

Figure 3:
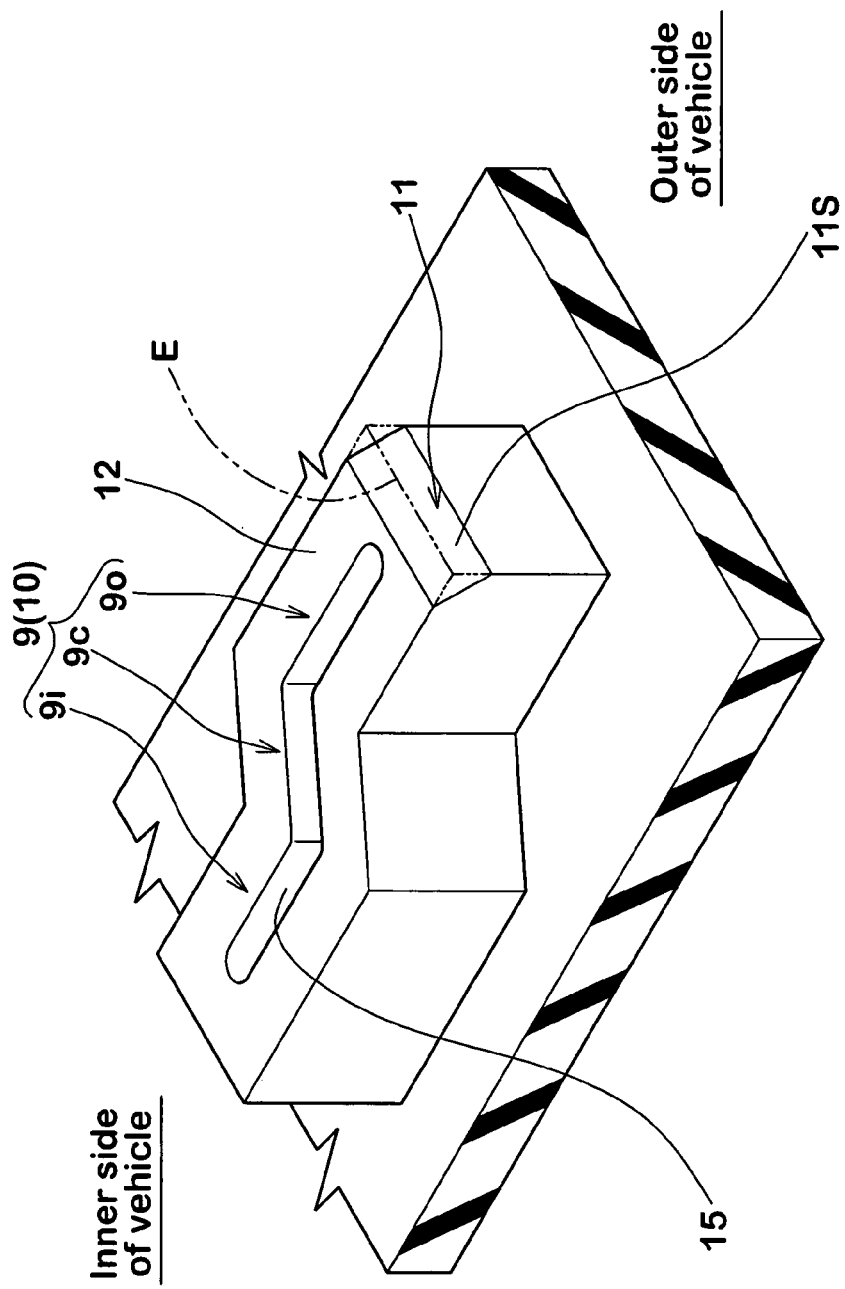
FIG. 3 is an enlarged perspective view of a block.
Figure 4:
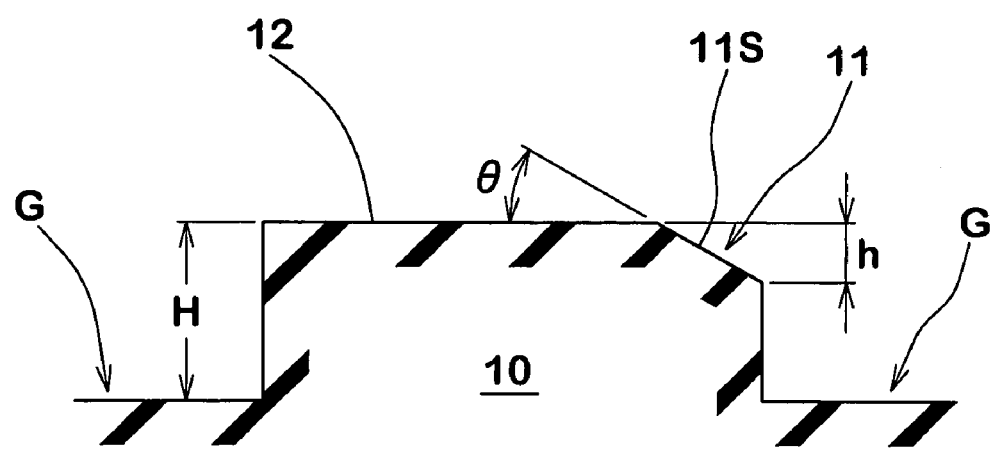
FIG. 4 is a sectional view of the block.
Figure 5:
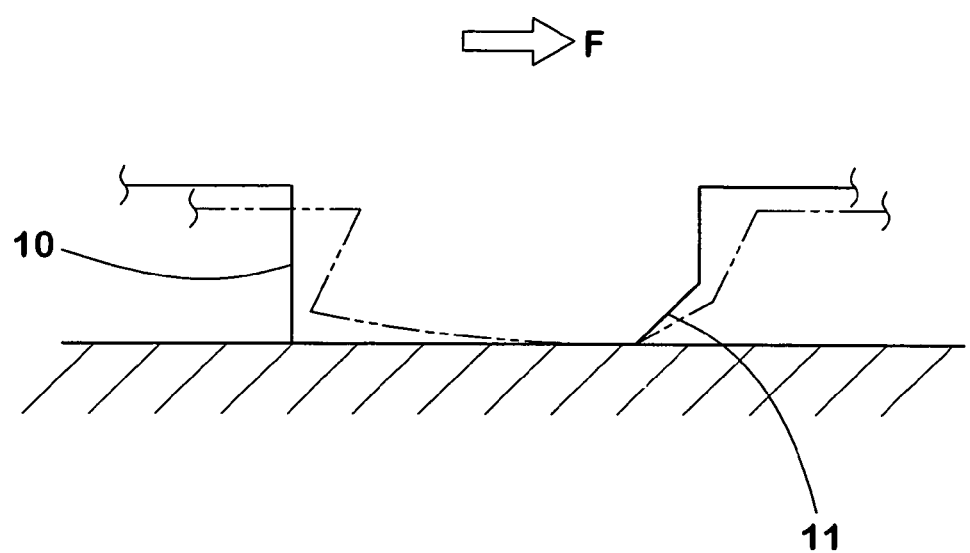
FIG. 5 is a sectional view showing a state of the block at the time of cornering.

In this embodiment, each the block 9 comprises a chamfered block 10 as shown in FIGS. 3 and 4. The chamfered block 10 is formed with a notch 11 formed in an outer side block edge E which is directed outward of the vehicle when the tire is mounted to the vehicle. The notch 11 comprises an inclined surface 11S formed by chamfering a corner between a block upper surface 12 and a block wall surface. When such a notch 11 is provided, as shown in FIG. 5, if centrifugal force F is applied to the block 10 at the time of cornering, the block 10 is prone to fall outwardly in the cornering direction by the notch 11. This configuration reduces the lateral grip force, and makes it possible to slide the tire in the lateral direction with small lateral force. Therefore, the cornering ability is enhanced. Further, the rigidity of the block 10 in the circumferential direction of the tire is not substantially varied, it is possible to prevent the traction ability at the time of straight running from being deteriorated.

The outer side block edge E may be provided with the notch 11 only partially, but it is preferable that the notch 11 is provided over 80% or more of the outer side block edge E, and more preferably the notch 11 is provided over the entire outer side block edge E. As shown in FIGS. 3 and 4, the angle θ between the inclined surface 11S of the notch 11 and the block upper surface 12 is 30 to 60°, and more preferably 40 to 50°.

If the inclination angle θ of the inclined surface 11S is smaller than 30°, sufficient effect for sliding the tire in the lateral direction at the time of cornering can not be obtained, and if the inclination angle θ exceeds 60°, the lateral rigidity of the block 10 is prone to be reduced excessively, and the cornering stability at the time of cornering is prone to be deteriorated.

It is preferable that a height h of the notch 11 in its radial direction is 25 to 50% of a height H of the chamfered block 10. If the height h of the notch 11 is smaller than 25% of the height H of the block, sufficient effect for sliding the tire in the lateral direction at the time of cornering can not be obtained. If the height h of the notch 11 exceeds 50% of the height H of the block, the lateral rigidity of the block 10 is prone to be deteriorated or the adhesion area is reduced and the cornering stability is prone to be deteriorated. It is most preferable that the height h of the notch is 40 to 50% of the height H of the block. Although the number of the chamfered blocks 10 is equal to 100% of the total number of the blocks 9, but if the number of the chamfered blocks 10 is 50% or more, the effect of the present invention can be expected. It is most preferable that the number of chamfered blocks 10 is 80% or more.

The block pattern of the ATV radial tire 1 of this embodiment is formed with a plurality main block rows R1 to R4 in which the laterally long blocks 9 are arranged in the circumferential direction of the tire. On the opposite ends of the tread, end block rows Re, Re are disposed. In the end block rows, end blocks 14 which are U-shaped as viewed from above are arranged in the circumferential direction of the tire. The main block rows includes a first main block row R1, a second main block row R2, a third main block row R3 and a fourth main block row R4. Centers of gravity of the first and second main block rows R1 and R2 are located at inner sides of the vehicle from a tire equator C, and centers of gravity of the third and fourth main block rows R3 and R4 are located at outer sides of the vehicle from the tire equator C.

In this embodiment, ground contact areas of the blocks 9 included in the first and second main block rows R1 and R2 are set greater than ground contact areas of the blocks 9 included in the third and fourth main block rows R3 and R4. The pitches between the blocks in the circumferential direction of the tire in each of the main block rows R1 to R4 are substantially the same. With this configuration, in the tread surface, a land ratio of the inner side of the vehicle from the tire equator C is set greater than a land ratio of the outer side of the vehicle from the tire equator C.

In the ATV radial tire 1, traction which may be generated in the tread surface is great on the inner side of the vehicle and is small on the outer side of the vehicle. Therefore, the tire is designed such that slip is prone to be generated on the outer side of the vehicle at the time of cornering based on such a land ratio. It is preferable to combine such a pattern with the chamfered block 10, because the cornering ability can further be enhanced. The land ratio on the inner side of the vehicle is preferably 1.1 to 1.5 times, more preferably 1.20 to 1.25 times the land ratio on the outer side of the vehicle. It is desirable that a block row closer to the outer side of the vehicle has smaller adhesion area of the block included in this block row.

Although the preferred embodiment of the present invention is described above, the invention is not limited to the illustrated embodiment, and it is of course possible to variously modify the interior structure of the tire, the block shape and the like and to carry out the invention.

EXAMPLE

ATV radial tires having the basic structure shown in FIGS. 1 and 3 and tire size of AT20×10R9 were prototyped according to a specification shown in Table 1, the prototyped tires were mounted to an actual vehicle and the tires were evaluated (traction, cornering ability (sliding ability), riding comfort, and total performance). A specification which is not shown in Table 1 is shown in Table 2, all the tire had the same specification.

The prototyped tires were evaluated using the actual vehicle in such a manner that the tires were mounted to all wheels of an ATV (rear wheel drive type four-wheeled sports car having piston displacement of 660 cm³) through rims (8.0 AT), internal pressure was charged into the tires, and the vehicle was allowed to run on a race road. The traction, cornering ability (sliding ability), riding comfort, and total performance were evaluated according to a five-point method by a driver's sensory evaluation. A result of the test is shown in Table 1, and the specification of the tires is shown in Table 2.

TABLE 1

(PS3439)

|  | Comparative example 1 | Example 1 | Example 2 | Example 3 | Example 4 | Example 5 |
|---|---|---|---|---|---|---|
| Land ratio [%] | 1.9 | 1.9 | 1.9 | 1.9 | 1.9 | 1.9 |
| Land ratio of inner side of vehicle/ land ratio of outer side of vehicle * | 1.0 | 1.0 | 1.0 | 1.0 | 1.2 | 1.5 |
| Presence of notch | Absence | Presence | Presence | Presence | Presence | Presence |
| Angle θ of inclined surface [deg] | — | 4 5 | 4 5 | 3 0 | 4 5 | 4 5 |
| Ratio (h/H) [%] | — | 5 0 | 2 5 | 2 5 | 5 0 | 5 0 |
| Evaluation using actual vehicle |  |  |  |  |  |  |
| Traction | 4.0 | 4.0 | 4.0 | 4.0 | 4.0 | 4.0 |
| Cornering ability (sliding ability) | 3.0 | 4.0 | 3.7 | 3.5 | 4.5 | 4.2 |
| Riding comfort | 4.0 | 4.0 | 4.0 | 4.0 | 4.0 | 4.0 |
| Total performance | 3.0 | 4.0 | 3.7 | 3.5 | 4.2 | 4.1 |

* Land ratio of inner side of vehicle . . . Land ratio of inner side of vehicle from tire equator
Land ratio of outer side of vehicle . . . Land ratio of outer side of vehicle from tire equator

TABLE 2

(PS3439)

| Tread pattern | FIG. 2 |
|---|---|
| Carcass |  |
| The number of plies | 2 |
| Cord angle | 87° |
| Cord structure | Nylon 1400 dtex |
| Belt layer |  |
| The number of plies | 2 |
| Cord angle | 27° |
| Cord structure | Nylon 1400 dtex |

As a result of the test, it can be confirmed that in the tires of the examples of the present invention, the cornering ability is enhanced without deteriorating the traction. That is, it can be confirmed that the tires of the present invention are excellent.

As explained above, in the ATV radial tire of the present invention, it is possible to enhance the sliding ability and the cornering ability at the time of cornering without deteriorating the traction.

What is claimed is:

1. An ATV radial tire having a block pattern which comprises a plurality of blocks disposed on a tread surface at distances from one another, wherein said blocks include chamfered blocks, said chamfered blocks including a notch which comprises an inclined surface obtained by chamfering a corner between an upper surface of the block and a wall surface of the block on an outer side edge of the block which is directed outward of a vehicle when the tire is mounted on the vehicle, wherein said chamfered blocks are laterally long in which a length of the block in an axial direction of the tire is longer than a length of the block in a circumferential direction of the tire, said chamfered blocks comprise an outer side portion which is located outward of the vehicle, an inner side portion which is located inward of the vehicle and which is deviated in the circumferential direction of the tire with respect to said outer side portion, and a connecting portion which obliquely extends in the circumferential direction of the tire and connects said inner side portion and said outer side portion with each other; and an angle θ of said inclined surface of said notch is 30 to 60° with respect to the upper surface of the chamfered blocks, and a height h of said notch in its radial direction is 25 to 50% of a height H of the block of said chamfered block.

2. The ATV radial tire according to claim 1, wherein said chamfered blocks occupy 50 to 100% of the total number of blocks.

3. The ATV radial tire according to claim 1, wherein said outer side portion and inner side portion are rectangular shapes which extend in parallel to the axial direction of the tire, and said connecting portion is inclined with respect to the circumferential direction of the tire through 30 to 600°.

4. The ATV radial tire according to claim 3, wherein the angle θ of said inclined surface of said notch is 40 to 50°.

5. The ATV radial tire according to claim 1, wherein a land ratio of an inner side of the vehicle from a tire equator C is greater than a land ratio of an outer side of the vehicle.

6. The ATV radial tire according to claim 5, wherein the land ratio of the inner side of the vehicle from the tire equator C is 1.1 to 1.5 times the land ratio of the outer side of the vehicle.

7. The ATV radial tire according to claim 1, wherein the blocks are defined by grooves in the circumferential and axial directions of the tire.

8. The ATV radial tire according to claim 1, wherein the chamfered blocks have only one notch.

9. The ATV radial tire according to claim 1, wherein the chamfered blocks have a shape which is at least partially rectangular, trapezoidal, substantially pentagonal, or elliptical when viewed from above.

10. The ATV radial tire according to claim 1, wherein the ratio of the length of the chamfered blocks in the axial direction to the length of the chamfered blocks in the circumferential direction is within the range of 2.0 to 4.0.

11. The ATV radial tire according to claim 1, wherein the ratio of the length of the chamfered blocks in the axial direction to the length of the chamfered blocks in the circumferential direction is within the range of 2.5 to 3.5.

12. The ATV radial tire according to claim 1, wherein the angle $\theta$ of said inclined surface of said notch is 40 to 50°.

13. The ATV radial tire according to claim 1, wherein the height h is 40 to 50% of the height H.

14. The ATV radial tire according to claim 1, wherein a height h of said notch in its radial direction is 25 to 50% of a height H of the block of said chamfered block.

15. An ATV radial tire having a block pattern which comprises a plurality of blocks disposed on a tread surface at distances from one another, wherein said blocks include chamfered blocks, said chamfered blocks including a notch which comprises an inclined surface obtained by chamfering a corner between an upper surface of the block and a wall surface of the block on an outer side edge of the block which is directed outward of a vehicle when the tire is mounted on the vehicle, wherein said plurality of blocks comprise end blocks which form end block rows disposed along opposite axial ends of the tread, and main blocks which form a plurality of main block rows disposed between said end block rows, and said main blocks comprise said chamfered blocks, wherein the main blocks in a circumferential main block row outward of the vehicle have a ground contact area smaller than a ground contact area of main blocks in a circumferential main block row inward of the vehicle; and an angle $\theta$ of said inclined surface of said notch is 30 to 60° with respect to the upper surface of the chamfered blocks, and a height h of said notch in its radial direction is 25 to 50% of a height H of the block of said chamfered block.

16. The ATV radial tire according to claim 14, wherein the height h is 40 to 50% of the height H.

* * * * *